US009035589B2

(12) United States Patent
Nemeth-Csoka

(10) Patent No.: US 9,035,589 B2
(45) Date of Patent: May 19, 2015

(54) METHOD AND PROCESSING UNIT FOR DETERMINING THE POSITION OF THE ARMATURE OF A SYNCHRONOUS MACHINE RELATIVE TO THE STATOR OF THE SYNCHRONOUS MACHINE

(75) Inventor: Mihaly Nemeth-Csoka, Erlangen (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 220 days.

(21) Appl. No.: 13/606,877

(22) Filed: Sep. 7, 2012

(65) Prior Publication Data
US 2013/0241454 A1 Sep. 19, 2013

(30) Foreign Application Priority Data

Sep. 9, 2011 (EP) ..................................... 11180704

(51) Int. Cl.
*H02P 6/00* (2006.01)
*H02P 6/18* (2006.01)
*H02P 21/14* (2006.01)

(52) U.S. Cl.
CPC ................ *H02P 6/183* (2013.01); *H02P 6/185* (2013.01); *H02P 21/146* (2013.01)

(58) Field of Classification Search
USPC ............ 318/400.02, 400.32, 400.33, 400.35, 318/439
See application file for complete search history.

(56) References Cited

U.S. PATENT DOCUMENTS

| 7,746,023 | B2* | 6/2010 | Ajima et al. ................... 318/700 |
| 2005/0057212 | A1* | 3/2005 | Harbaugh et al. ............. 318/809 |
| 2005/0187735 | A1* | 8/2005 | Nemeth-Csoka et al. ..... 702/151 |
| 2011/0199031 | A1* | 8/2011 | Balazovic et al. ........ 318/400.33 |
| 2011/0248659 | A1* | 10/2011 | Balazovic et al. ........ 318/400.33 |
| 2012/0217849 | A1* | 8/2012 | Aoki et al. ................... 310/68 D |
| 2013/0049656 | A1* | 2/2013 | Yasui ....................... 318/400.02 |

FOREIGN PATENT DOCUMENTS

| DE | 10056879 | C1 | 7/2002 |
| DE | 10215428 | A1 | 10/2003 |
| DE | 102004008250 | A1 | 10/2005 |
| DE | 102005059477 | A1 | 6/2007 |
| EP | 0827267 | A1 | 3/1998 |
| EP | 2194641 | A1 | 6/2010 |

* cited by examiner

Primary Examiner — Rina Duda
Assistant Examiner — Bickey Dhakal
(74) Attorney, Agent, or Firm — Henry M. Feiereisen LLC

(57) ABSTRACT

A method for determining a position of an armature of a synchronous machine relative to a stator of the synchronous machine includes the steps of applying to the synchronous machine a plurality of test current vectors, with each test current vector having identical current magnitude and a different angle in relation to an armature-related d,q coordinate system, during application of the test current vectors to the synchronous machine, determining values of a physical response quantity of the armature proportional to the q component of the test current vectors, determining a first harmonic of the determined values of the physical response quantity as a function of the angle, and determining the position of the armature relative to the stator as a zero crossing of the first harmonic where a first derivative of the first harmonic is positive.

11 Claims, 5 Drawing Sheets

METHOD AND PROCESSING UNIT FOR DETERMINING THE POSITION OF THE ARMATURE OF A SYNCHRONOUS MACHINE RELATIVE TO THE STATOR OF THE SYNCHRONOUS MACHINE

CROSS-REFERENCES TO RELATED APPLICATIONS

This application claims the priority of European Patent Application, Serial No. 11180704.6, filed Sep. 9, 2011, pursuant to 35 U.S.C. 119(a)-(d), the content of which is incorporated herein by reference in its entirety as if fully set forth herein.

BACKGROUND OF THE INVENTION

The present invention relates to a method and a processing unit for determining the position of the armature of a synchronous machine relative to the stator of said synchronous machine.

The following discussion of related art is provided to assist the reader in understanding the advantages of the invention, and is not to be construed as an admission that this related art is prior art to this invention.

The prior art discloses numerous methods by which the position of the armature of a synchronous machine can be determined. Many of these methods are based on costly measurements of the inductivities of the primary circuit coils, or on the measurement and analysis of the electromotive counterforce. Such methods allow a synchronous machine to be operated entirely without a position measuring device.

In the present document, the term synchronous machine is understood to include linear synchronous machines, rotor-based synchronous machines, separately excited synchronous machines and self-excited synchronous machines. The term synchronous machine includes all machines in which the armature field moves synchronously relative to the stator field, and therefore brushless direct-current motors and electronically commuted motors are also covered by the term synchronous machine. If a current vector is specified, in the phasor diagram it has the magnitude of the space phasor, which was calculated on the basis of the impressed currents, and the direction of the space phasor. All of the angle data relating to the armature of the synchronous machine relates in the following to an electric period, i.e. to a complete rotation of the current vector. For example, a complete rotation of the motor shaft can correspond to a plurality of electric periods in a rotor-based synchronous machine. This applies in particular if the number of poles is greater than one.

It would therefore be desirable and advantageous to obviate prior art shortcomings and to provide an improved method for determining the position of the armature of a synchronous machine relative to the stator of the synchronous machine.

SUMMARY OF THE INVENTION

According to one aspect of the present invention, a method for determining a position of an armature of a synchronous machine relative to a stator of the synchronous machine includes the steps of applying to the synchronous machine a plurality of test current vectors, with each test current vector having identical current magnitude and a different angle in relation to an armature-related d,q coordinate system, during application of the test current vectors to the synchronous machine, determining values of a physical response quantity of the armature proportional to the q component of the test current vectors, determining a first harmonic of the determined values of the physical response quantity as a function of the angle, and determining the position of the armature relative to the stator as a zero crossing of the first harmonic where a first derivative of the first harmonic is positive.

According to another aspect of the invention, a processing unit for determining a position of an armature of a synchronous machine relative to a stator of the synchronous machine, includes a determination unit for specifying to a converter unit reference values of test current vectors, with each test current vector having identical current magnitude and a different angle in relation to an armature-related d,q coordinate system, a determination unit for determining, during application of the test current vectors to the synchronous machine, values of a physical response quantity of the armature proportional to the q component of the test current vectors, a determination unit for determining a first harmonic of the determined values of the physical response quantity as a function of the angle, and a determination unit for determining the position of the armature relative to the stator as a zero crossing of the first harmonic where a first derivative of the first harmonic is positive.

The method according to the invention exploits the proportional dependency of the physical response quantity of the armature on the angle of the test current vectors. By virtue of each of the test current vectors applied to the synchronous machine having the same magnitude, it is ensured that the absolute quantity of the respective test current vectors does not have any influence on the physical response quantity and that the latter is determined exclusively by the respective angle of the test current vectors. Considerations relating to the physical response quantity preferably take place in the armature-related d,q system of coordinates, wherein the q component of a current vector forms the moment and the d component of a current vector forms the flow.

When a test current vector is impressed at an angle that is perpendicular to the q axis, the physical response quantity for this test current vector has the value 0. However, the physical response quantity assumes its positive or negative extreme value if the test current vector points in the direction of the positive or negative q axis. As a result of the geometry, it therefore follows that the respective value of the physical response quantity is associated with the corresponding angle via a sinusoidal function. As mentioned above, by virtue of selecting the same magnitude for the test current vectors, the physical response quantity is determined exclusively via the angle of the test current vectors, more specifically the q component of the test current vectors.

The physical response quantity of the armature is determined as a function of the angle during the application of the test current vectors to the synchronous machine. As a result of the relationships explained above, the physical response quantity of the armature can be mathematically characterized by the first harmonic as a function of the angle. The first harmonic of the determined values of the physical response quantity is therefore determined as a function of the angle. The first harmonic has two extremes and two zero crossings, wherein the extremes occur when the synchronous machine is subjected to those test current vectors for which the corresponding angle lies parallel or antiparallel relative to the direction of the positive q axis. The two zero crossings of the first harmonic can be distinguished from each other by a different operational sign of the first derivative of the harmonic relative to the angle. The first harmonic assumes the value 0 with a positive first derivative for that case in which the applied current vector points in the direction of the positive d axis. This criterion is exploited by the inventive method for the purpose of determining the d axis of the armature-related d,q system of coordinates, which is synonymous with determining the position of the armature.

According to an advantageous feature of the present invention, test current vectors may be applied to the synchronous machine by a converter unit, which receives reference values for the test current vectors from a corresponding processing unit. The first harmonic or its zero crossing which has a positive first derivative may be determined e.g. by a controller, microcontroller or digital signal processor (DSP).

The method advantageously functions independently of the saturation properties of a synchronous machine. The method results in only minimal movement and minimal noise development in this case, and can be performed with or without the presence of a brake. The inventive method is generally applicable and is not limited to specific cases in its use.

According to an advantageous feature of the present invention, the method may include the additional steps of:
  determining the correlation between the determined values of the physical response quantity and the determined first harmonic,
  comparing the determined correlation with a predetermined minimal value, and
  when the determined correlation is less than the predetermined minimal value: repeating the previous method steps using a plurality of further test current vectors, each of which has the same current magnitude and each of which has a different angle relative to the d,q system of coordinates, wherein the current magnitude of the further test current vectors is greater than the current magnitude of the previously used test current vectors.

Since synchronous machines for industrial use are often operated in environments that include vibrations, mechanical shocks and the like, determining the physical response quantity in an error-free, reliable and precise manner sometimes presents difficulties. In other words, measured signals can be disrupted and superimposed by noise, for example. It is therefore beneficial to perform a type of plausibility test in respect of the determined physical response quantity and validate the determined result. The correlation between the determined values of the physical response quantity and the determined first harmonic is calculated for this purpose. This can be done by a controller, microcontroller or digital signal processor (DSP) in particular.

According to an advantageous feature of the present invention, in order to assess whether the values of the physical response quantity were determined with a sufficient degree of precision and reliability during the application of a plurality of test current vectors to the synchronous machine, the correlation between the determined values of the physical response quantity and the determined first harmonic may be determined and subsequently be compared with a predetermined minimal value. This predetermined minimal value is therefore a threshold value that reflects whether the application of a plurality of test current vectors to the synchronous machine produced satisfactory results. Experience indicates that a predetermined minimal value in the order of e.g. 0.8 produces meaningful results, i.e. a reliable determination of the position of the armature.

However, when the determined correlation is less than the predetermined minimal value, the method steps are repeated using a plurality of additional test current vectors. Each of these further test current vectors has a different angle relative to the d,q system of coordinates, but each has the same current magnitude, this being greater than the current magnitude of the previously used test current vectors. In the event that the application of the further test current vectors to the synchronous machine likewise fails to produce satisfactory results, the method can be repeated using current vectors of greater magnitude in each case until satisfactory results are achieved.

According to another advantageous feature of the present invention, the physical response quantity may be a force acting on the armature. The force may be measured e.g. using sensors, in particular piezoelectric sensors, strain gauges or micro-electromechanical systems (MEMS).

Advantageously, in the case of linear synchronous machines, the force may be determined on the basis of Hooke's law, according to which the mechanical tension is equal to the product of the elasticity modulus and the mechanical strain. In this case, the strain is the relative change in length of the armature in the direction of the applied force and the tension is the quotient of applied force and corresponding cross-sectional area. The elasticity modulus is a material characteristic value from the field of materials engineering, wherein said value is assumed to be known for the armature material. The force can therefore be determined by measuring the strain, e.g. by strain gauges, if the cross-sectional area is known.

Advantageously, in the case of rotor-based synchronous machines (in which the armature is embodied as a rotor), the force may be determined e.g. by measuring a torsion of the rotor. The applied force results in a torsional moment which is the product of the force and the corresponding lever arm. The angle of twist is the product of the torsional moment and the relevant axial rotor length, wherein the cited product is divided by the product of modulus of rigidity and torsional moment of inertia. The modulus of rigidity here is likewise a material characteristic value from the field of materials engineering, wherein said value can be assumed to be known for the rotor material, and the torsional moment of inertia is likewise known as a geometric quantity from technical mechanics. Since the angle of twist can be measured by strain gauges in particular, the force can be determined therefrom.

According to an advantageous feature of the present invention, the physical response quantity may be an acceleration of the armature. The acceleration may be determined by direct measurement using sensors, for example, wherein in particular piezoelectric acceleration sensors and miniaturized acceleration sensors can be used as micro-electromechanical systems (MEMS). Strain gauges or sensors, which utilize the magnetic induction in the same way as a dynamic microphone, may also be used. Such sensors induce an electrical tension in a coil via movement of a magnetic test mass that is suspended from a spring. The acceleration may also be determined indirectly, e.g. using a measurement of the change in the speed or a change in the position of the armature within a specific time.

According to another advantageous feature of the present invention, the angle of the test current vectors may be selected such that the determined values of the physical response quantity of the armature oppose each other in two consecutive applications. In this way, the speed or displacement of the armature resulting from an application of one test current vector is at least partially compensated during the next application. A cumulative resulting displacement of the armature in a specific direction during a plurality of consecutive applications of test current vectors to the synchronous machine is therefore counteracted. In other words, provision is therefore made for maintaining the cumulative resulting acceleration close to 0 during a plurality of consecutive applications, such that the armature does not gather speed in a specific direction and does not move too far from its position before the applications of test current vectors.

This can be done, e.g., by moving the angle of a test current vector by approximately 180° relative to the angle of the immediately preceding test current vector. In order that the entire cycle from 0° to 360° is covered by the angle, every angle can be moved in this case by e.g. 185° or 175° relative to the respective angle of the immediately preceding test current vector. A further possibility is the selection of angle pairs relating to consecutive test current vectors. For example, a first angle pair is formed by test current vectors having the angles 10° and 190° and a second angle pair is formed by test current vectors having the angles 20° and 200°. Further angle pairs can be formed in a corresponding manner. As a consequence, the resulting cumulative acceleration during a plurality of consecutive applications is close to 0, since the physical response quantity corresponding to each individual test current vector is compensated by a corresponding test current vector.

According to another advantageous feature of the present invention, the acceleration of the armature can be determined by measuring the change in position of the armature caused by a current vector, and the time required for this change. The acceleration is calculated as a quotient of the change in position and the square of the required time.

Advantageously, the change in position of the armature caused by a current vector may be determined by an incremental transducer. Synchronous machines are often equipped with an incremental transducer, wherein this type of sensor can only determine the relative position of the armature and therefore the change in position in particular. If it is desirable to determine the absolute position of the armature relative to the stator using an incremental transducer, the armature must be advanced to a reference position (e.g. a zero mark) when the synchronous machine is activated, in order to perform a type of calibration and to associate the information from the incremental transducer in respect of a relative position of the armature with an absolute position in respect of the stator. The advantage of this embodiment of the method according to the present invention is now to use such an incremental transducer in order to determine the absolute location of the armature relative to the stator of the synchronous machine. This is achieved by measuring the change in position of the armature that is caused by a current vector, said change in position being measured using the incremental transducer, and additionally capturing the time that is required for said change in position. Since the acceleration that is caused by a current vector is equal to the measured change in position divided by the square of the time that is required for it, it is therefore possible to determine the respective acceleration for each of the test current vectors, e.g. by a controller, microcontroller or digital signal processor (DSP). The accelerations thus determined are then used to determine the corresponding first harmonic and finally to determine the position of the armature relative to the stator of the synchronous machine as that zero crossing of the first harmonic in which a positive first derivative of the first harmonic is present.

According to an advantageous feature of the present invention, the change in position of the armature caused by a current vector may likewise be measured with an absolute value transducer. According to this embodiment of the method according to the present invention, only the information relating to the change in position is required, which can also be provided by the absolute value transducer. The absolute value transducer is also suitable for directly determining the absolute location of the armature relative to the stator of the synchronous machine.

In a further advantageous embodiment of the method according to the present invention, the method may additionally include the steps of:
measuring the absolute position of the armature using an absolute value transducer,
calculating the deviation of the measured absolute position from the position of the armature that was determined by the first harmonic, and
outputting an error message when the calculated deviation is greater than a predetermined value.

The position of the armature relative to the stator of the synchronous machine is determined on the basis of that zero crossing of the first harmonic in which a positive first derivative of the first harmonic is present. As a result of using an absolute value transducer, the position of the armature can be determined in a second way, which is independent of the determination of the first harmonic. The use of two independent methods for determining the position of the armature therefore provides a redundancy that can be used for safety applications. For this purpose, the deviation of the absolute position as measured by the absolute value transducer from the position of the armature as determined by the first harmonic is calculated by a controller, microcontroller or digital signal processor (DSP) in particular. If the calculated deviation is greater than a predetermined value, an error message can be output by e.g. a controller, microcontroller or digital signal processor (DSP), in particular to a supervisory control unit which can switch off the synchronous machine if necessary. In order to make further allowance for safety considerations, the calculation of the deviation can be executed by a separate controller that does not have any other tasks to perform. The transmission of the error message can take place correspondingly via an additional or redundant communication connection between the separate controller and the supervisory controller, wherein e.g. safety-oriented protocols such as SafetyBus p can be used.

Values of the physical response quantity can be determined directly by corresponding sensors, for example, wherein the determined values are used by e.g. controllers, microcontrollers or digital signal processors (DSP) in order to determine the first harmonic. In the event that a sensor is used for determining the physical response quantity and said sensor is embodied as a transducer, it is likewise conceivable to integrate the above cited sensor in this transducer such that the determination of the position of the armature is effectively performed locally. This makes it possible to provide more intelligence locally within a complex machine and to reduce the load on a supervisory controller. At the same time, the requirement for communication between the individual machine parts and the supervisory controller is reduced.

In principle, the processing unit can also be embodied as a stored programmable control comprising the above cited components.

In an advantageous embodiment of the processing unit of the present invention, the processing unit further may include:
a processor for determining the correlation between the determined values of the physical response quantity and the determined first harmonic, and
a processor for comparing the determined correlation with a predetermined minimal value.

The determination of the correlation and the comparison of the correlation with the predetermined minimal value can again be performed by a controller, microcontroller or digital signal processor (DSP).

Since measured signals can be disrupted and superimposed by noise, for example, it is beneficial to perform a type of plausibility test in respect of the determined physical response quantity and validate the determined result. For this purpose, the correlation between the determined values of the physical response quantity and the determined first harmonic is calculated, e.g. by a controller, microcontroller or digital signal processor (DSP). The comparison of the determined correlation with the predetermined minimal value can likewise be performed by a controller, microcontroller or digital signal processor (DSP).

According to an advantageous feature of the present invention, the processing unit may be used in an absolute value transducer for measuring the absolute position of the armature, wherein the processing unit further includes:
- a processor for calculating the deviation of the measured absolute position from the position of the armature that is determined by the first harmonic, and
- a processor for outputting an error message if the calculated deviation is greater than a predetermined value.

As a result of using an absolute value transducer, the position of the armature can be determined in a way that is independent of the determination of the first harmonic and the position of the armature that is determined therefrom. The use of two independent methods for determining the position of the armature therefore provides a redundancy that can be used for safety applications. For this purpose, the deviation of the absolute position which is measured by the absolute value transducer from the position of the armature that is determined by the first harmonic is calculated by a controller, microcontroller or digital signal processor (DSP) in particular.

When the calculated deviation is greater than a predetermined value, an error message may be outputted by e.g. a controller, microcontroller or digital signal processor (DSP), in particular to a supervisory control unit which can switch off the synchronous machine if necessary. In order to make further allowance for safety considerations, the processor for calculating the deviation can be embodied as a separate controller that does not have any other tasks to perform. The transmission of the error message can take place correspondingly via an additional or redundant communication connection between the separate controller and the supervisory controller, wherein e.g. safety-oriented protocols such as SafetyBus p can be used.

According to an advantageous feature of the present invention, the processing unit may be operated within a control unit for a synchronous machine, wherein the control unit includes a converter unit for applying the test current vectors to the synchronous machine. The control unit may be arranged, e.g., in the converter unit. Furthermore, an absolute value transducer may be used for measuring the absolute position of the armature, wherein the processing unit may further include:
- a processor for calculating the deviation of the measured absolute position from the position of the armature that is determined by the first harmonic, and
- a processor for outputting an error message if the calculated deviation is greater than a predetermined value.

A control unit thus equipped can obviously allow for the above cited safety considerations by embodying the processor for calculating the deviation as a separate controller that does not have any other tasks to perform. The transmission of the error message can take place correspondingly via an additional or redundant communication connection between the separate controller and the supervisory controller, wherein e.g. safety-oriented protocols such as SafetyBus p can be used.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
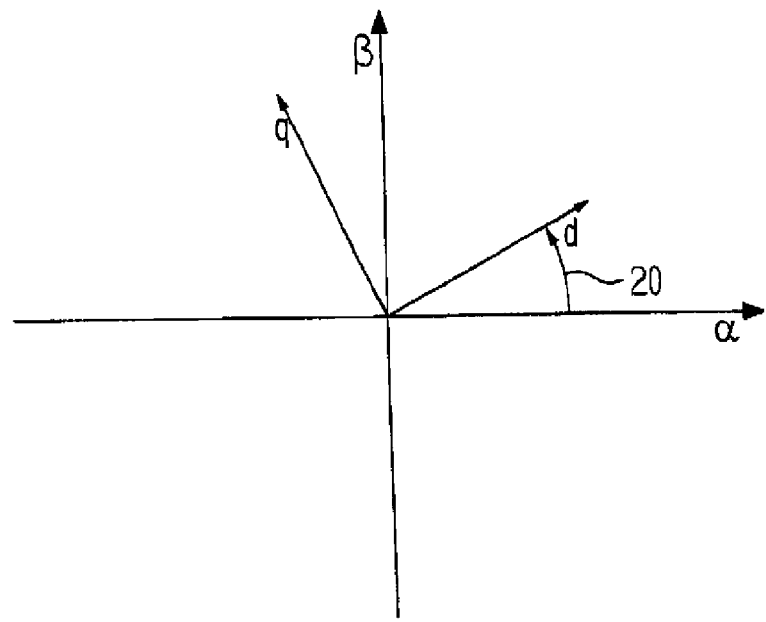
FIG. 1 shows a phasor diagram featuring a stator-related $\alpha,\beta$ system of coordinates and an armature-related d,q system of coordinates according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a phasor diagram featuring a stator-related $\alpha,\beta$ system of coordinates and an armature-related d,q system of coordinates. A synchronous machine can be described by the two systems of coordinates cited above. Both feature two axes in each case, these being perpendicular to each other, wherein the stator-related $\alpha,\beta$ system of coordinates does not move during the operation of the synchronous machine. In the case of synchronous machines, the armature-related d,q system of coordinates moves synchronously relative to the moving excitation field, meaning that a position 20 of an armature 1 changes synchronously relative to the moving magnetic rotating field. See the further figures for the reference signs that are cited here but are not illustrated in FIG. 1.

Figure 2:
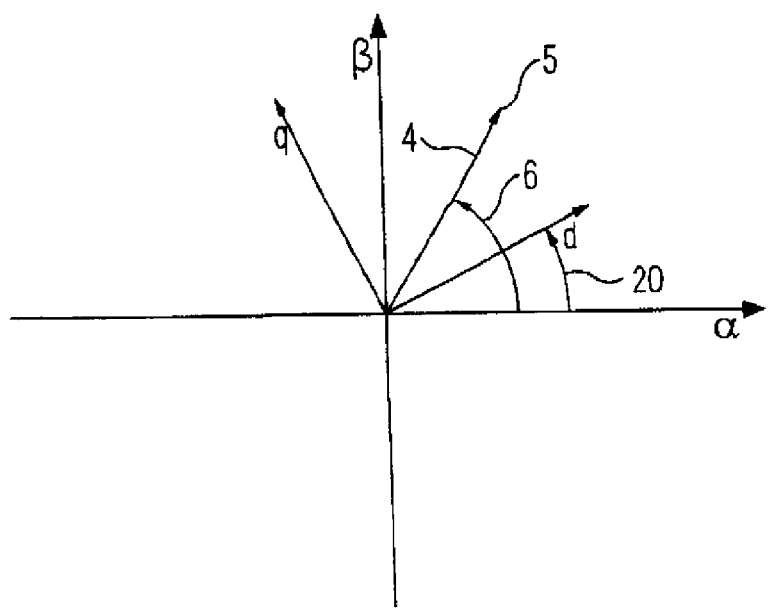
FIG. 2 shows a phasor diagram featuring a test current vector.

FIG. 2 shows a phasor diagram featuring a test current vector. The test current vector 4 is determined by its current magnitude 5 and its angle 6 relative to the stator-related $\alpha,\beta$ system of coordinates. Since the stator-related $\alpha,\beta$ system of coordinates does not move, the respective angle 6 of the test current vectors 4 is known when it is applied to a synchronous machine. When a synchronous machine 2 is activated in particular, a position 20 of an armature 1 is unknown in the case of many synchronous machines. In such cases, the angle between the positive d axis of the armature-related d,q system of coordinates and the positive a axis of the stator-related $\alpha,\beta$ system of coordinates remains unknown initially. The simplified determination of this angle or the position 20 of the armature 1 is the subject matter of this invention.

The test current vector 4 can be generated e.g. by subjecting the stator windings of a synchronous machine to a three-phase current. Three phase currents I_u 41, I_v 42, and I_w 43 corresponding to the test current vector 4 can be equivalently transferred to the immobile stator-related α,β system of coordinates using a α,β transformation, or to the moving armature-related d,q system of coordinates using a d,q transformation. The test current vector 4 can be broken down into two components along the axes of the d,q system of coordinates, wherein the d component of the test current vector 4 forms the flow and the q component of the test current vector 4 forms the moment. See the further figures for the reference signs that are cited here but are not illustrated in FIG. 2.

Figure 3:
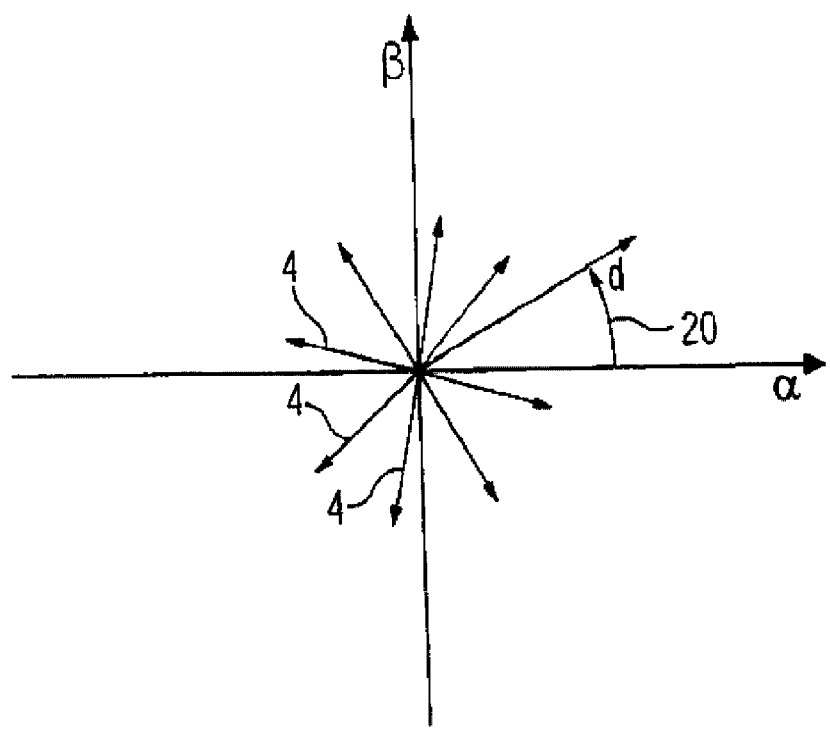
FIG. 3 shows a phasor diagram featuring a plurality of test current vectors.

FIG. 3 shows a phasor diagram featuring a plurality of test current vectors. Each of the test current vectors 4 has the same current magnitude 5 but a different angle 6 in each case. As a result of the identical current magnitude 5 in each case, the q component of each test current vector 4 depends exclusively on its respective angle 6 and not on its respective current magnitude 5. If a physical response quantity 7 can be determined, e.g. by direct measurement, the response quantity 7 being proportional to the q component of the test current vector 4, a position 20 of an armature 1 can be determined from the dependence of the response quantity 7 on the respective angle 6 of the applied current vector 4. Accordingly, the angle between the positive d axis of the armature-related d,q system of coordinates and the positive a axis of the stator-related α,β system of coordinates can be determined. It follows that the response quantity 7 and the angle 6 of the respective applied test current vector 4 are mathematically associated with each other via a sinusoidal function. See the further figures for the reference signs that are cited here but are not illustrated in FIG. 3.

Figure 4:
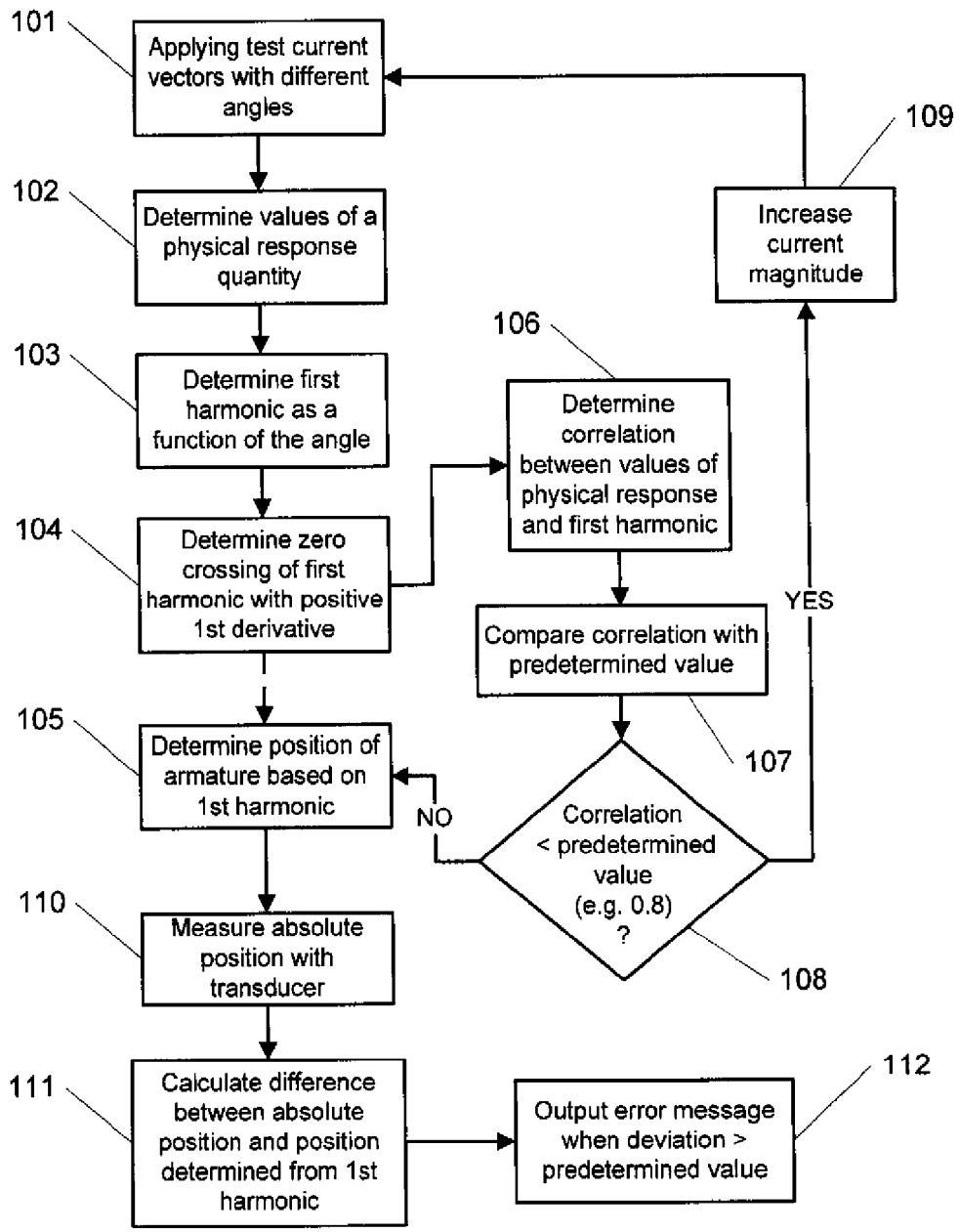
FIG. 4 shows a flow diagram of the inventive method for determining the position of the armature of a synchronous machine relative to the stator of the synchronous machine.

FIG. 4 shows a flow diagram of the inventive method for determining the position of the armature of a synchronous machine relative to the stator of the synchronous machine. At step 101, a plurality of test current vectors 4 are applied to the synchronous machine 2, wherein each of the test current vectors 4 has the same current magnitude 5, but a different angle 6 relative to an armature-related d,q system of coordinates. At step 102, values of a physical response quantity 7 of the armature 1 are determined during the application of the test current vectors 4 to the synchronous machine 2; the physical response quantity 7 is proportional to the q component of the test current vectors 4. At step 103, the first harmonic 53 of the determined values of the physical response quantity 7 is determined as a function of the angle 6. At step 104, a zero crossing of the first harmonic 53 having a positive first derivative determined. It is feasible to no go directly to step 105 to determine the position 20 of the armature 1 relative to the stator 3 of the synchronous machine 2 based on the zero crossing of the first harmonic 53 determined at step 104.

However, for increasing the reliability of the response, the process may go to step 106, where a correlation between values of the physical response quantity 7 and the first harmonic 53 is determined. At step 107, this correlation is compared with a predetermined value, for example a value of 0.8. When the correlation is greater than the predetermined value, i.e. when the correlation is reliable, at step 108, the process goes to step 105; otherwise, i.e. when the correlation is poor, the current magnitude 5 is increased, at step 109, while maintaining the previous angle 6 relative to an armature-related d,q system of coordinates. Thereafter, the process returns to step 101 for a more accurate physical response quantity 7.

The position determined from the first harmonic 53 may be compared with a measurement of the absolute position of the armature obtained with an absolute value transducer 15. To this end, at step 110, the absolute position of the armature is measured with the absolute value transducer, and the difference between the absolute position and the position determined from the first harmonic 53 is calculated, at step 111. An error message is outputted, at step 112, when the calculated deviation is greater than a predetermined value.

Reference is made here to the other figures where the reference symbols that are cited here but are not illustrated in FIG. 4 are shown.

Figure 5:
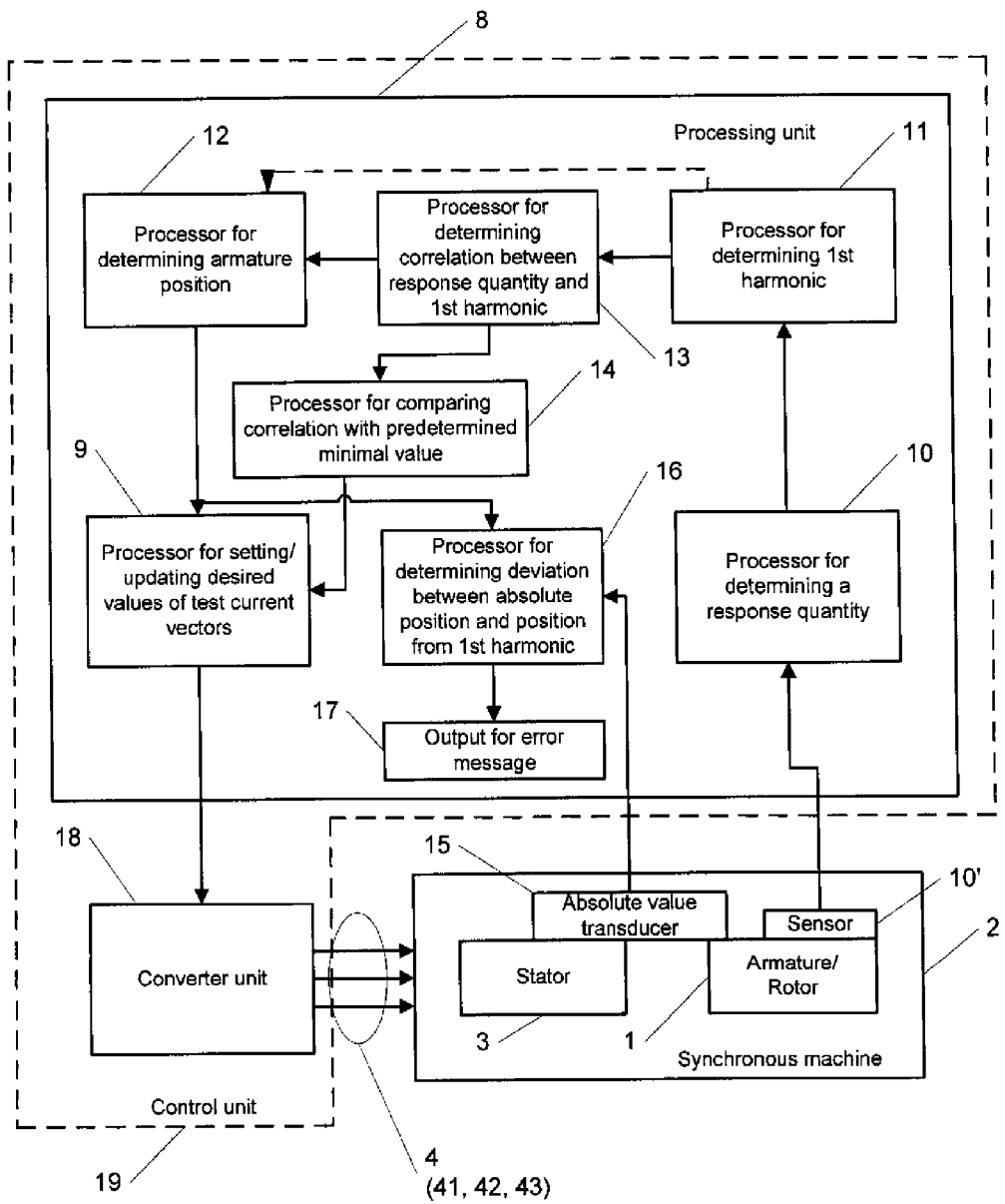
FIG. 5 shows a block schematic diagram of a control unit according to the present invention featuring a synchronous machine.

FIG. 5 shows a block schematic diagram of a control unit 19 according to the present invention having a synchronous machine. The synchronous machine 2 has a stator 3 and an armature 1 which is located at position 20 in FIGS. 1 through 3. The control unit 19 includes a processing unit 8 and a converter unit 18. The processing unit 8 includes a processor 9 for specifying reference (desired) values of test current vectors 4. The reference values of test current vectors 4 are transmitted to the converter unit 18, wherein the test current vectors 4 can be characterized in a two-axis stator-related α,β system of coordinates by specifying their respective current magnitude 5 and their respective angle 6 relative to the direction of the positive a axis. The test current vectors 4 are selected such that they each have the same current magnitude 5 but a different angle 6 in each case. Through a transformation, the test current vectors 4 can be equivalently expressed as three-phase current with the phase currents I_u 41, I_v 42, and I_w 43, wherein these phase currents are applied by the converter unit 18 to the synchronous machine 2. Application of the phase currents to the synchronous machine 2 causes the armature 1 to react, wherein the reaction can be expressed as a physical response quantity 7 that is proportional to the d component of the respectively applied current vector 4.

The processing unit 8 further includes a processor 10 for determining values of the response quantity 7 that can be representative of, for example, a force acting on the armature 2 or an acceleration or change in position of the armature 1. Accordingly, the processor 10 may receive a signal from a sensor 10', for example a piezoelectric sensor, strain gauge or micro-electromechanical sensor (MEMS) 10' operatively connected to the armature 1; alternatively, the signal may also be generated by a position measuring device, such as an incremental transducer or absolute value transducer 15. However, the sensors 10' and 15 may also be combined in a single sensor. The processor 10 then determines the physical response quantity 7 from the received signal.

The processing unit 8 additionally includes a processor 11 determining the first harmonic 53 of the response quantity 7 received from processor 10. As mentioned above, the values of the response quantity 7 depend on the applied test current vectors 4, more specifically the angle 6 of the respective test current vector 4, since the test current vectors 4 are selected to have the same current magnitude 5. The values of the response quantity 7 can therefore be expressed as a function of the angle 6 of the applied test current vectors 4, and a corresponding first harmonic 53 can be determined.

The processing unit 8 further includes a processor 12 for determining the position 20 of the armature 1. The determined first harmonic 53 is analyzed in the processor 12 to determine the position 20 of the armature 1 from the zero crossing of the first harmonic 53 having a positive first derivative.

While the processor 12 may receive the first harmonic directly from processor 11 (as indicated in FIG. 5 by the dashed line), another processor 13 for determining a correlation between the determined values of the response quantity 7 and the first harmonic 53 may be placed between the processors 11 and 12. The signal from processor 13 is the transmitted to a processor 14 which compares the correlation with a predetermined minimal value. If the correlation is poor, i.e. if the determined correlation is smaller than the minimal value, the processor 14 for comparing the determined correlation can send a feedback signal to the processor 9 for specifying reference values of test current vectors 4, whereby the application of test current vectors to the synchronous machine 2 is repeated using test current vectors that have a greater current magnitude 5. If applicable, the processor 13 for determining the correlation and the processor 14 for comparing can be embodied, for example, in the form of a controller, microcontroller or digital signal processor (DSP), as mentioned above. See the other figures for the reference symbols that are cited here but are not illustrated in FIG. 5.

The processor 11 for determining the first harmonic 53 and the processor 12 for determining the position 20 of the armature 1 can conceivably be embodied in the form of e.g. a controller, microcontroller or digital signal processor (DSP). If applicable, this controller, microcontroller or digital signal processor (DSP) can also assume the function of the processor 9 for specifying reference values of test current vectors 4, such that the processing unit 8 may be embodied as a controller, microcontroller or digital signal processor (DSP) including the processor 10 for determining values of the response quantity, wherein the various processors can be arranged within a module.

The processing unit 8 may further include a processor 16 for determining a deviation between the position determined from the first harmonic 53 and the position of the armature 1 determined from a signal from absolute value transducer 15. If processor 16 determines that the deviation is greater than a predetermined value, unit 17 outputs an error message commensurate with the determined deviation.

Figure 6:
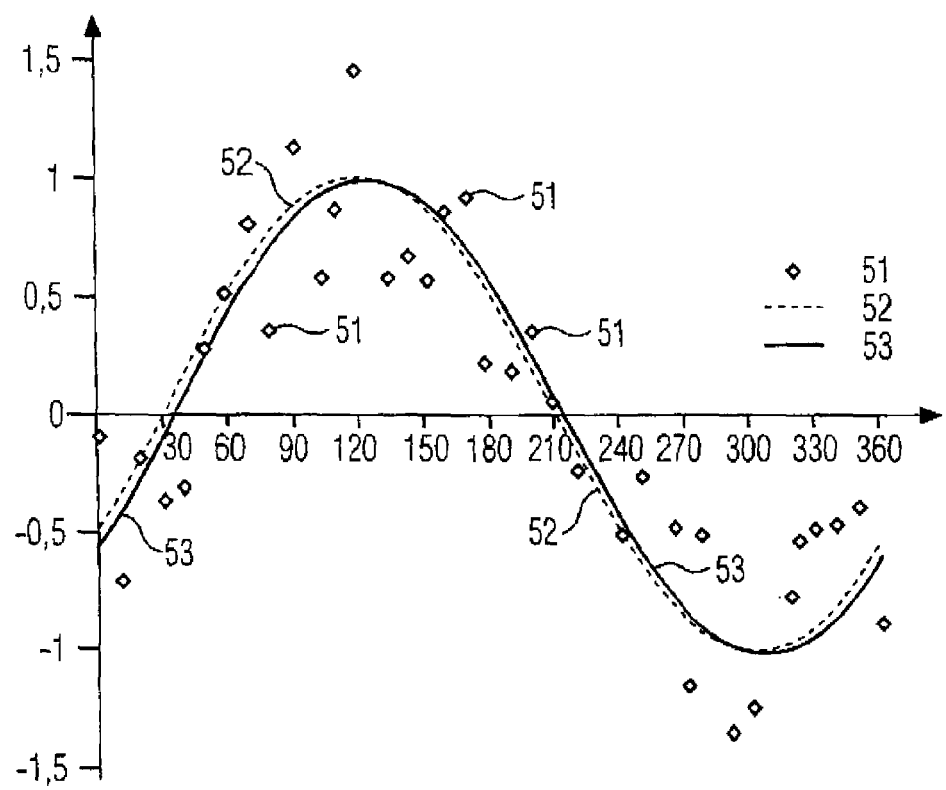
FIG. 6 shows an exemplary angle-dependent profile of the measured values of the physical response quantity and the first harmonic.

FIG. 6 shows an exemplary angle-dependent profile of the measured values of the physical response quantity and the first harmonic 53. An ideal curve 52 is shown in addition to the measured values 51 of the physical response quantity 7 and the first harmonic 53. The values of the physical response quantity 7 are plotted on the Y-axis depending on an angle 6 of an applied test current vector 4, wherein the angles 6 are plotted on the X-axis.

In order to create the angle-dependent profile of the measured values 51, a synchronous machine 2 is subjected to the test current vector 4, this being characterized by a current magnitude 5 and the angle 6 relative to the stator-related $\alpha,\beta$ system of coordinates. The application of the test current vector 4 to the synchronous machine 2 causes a reaction in the armature 1 of the synchronous machine 2, wherein said reaction can be expressed by a physical response quantity 7 that is proportional to the d component of the respectively applied current vector 4. Since the respective test current vectors 4 are selected such that they have an identical magnitude 5 but a different angle 6 in each case, the physical response quantity 7 depends solely on the angle 6 of the respectively applied test current vector 4. As mentioned above, the response quantity 7 and the respective angle 6 of the applied test current vector 4 are mathematically associated with each other via a sinusoidal function.

As a result of vibrations, mechanical shocks or measurement inaccuracies, the measured values 51 of the physical response quantity 7 can be disrupted and superimposed by noise, for example, such that they do not directly describe the expected sinusoidal function. A corresponding first harmonic 53 can nonetheless be determined, wherein that zero crossing having a positive first derivative corresponds to the position 20 of the armature 1. In the example shown in FIG. 6, the position 20 of the armature 1 is determined as being approximately 35°. For the purpose of comparison, the ideal curve 52 expressing the sinusoidal function that is expected for the physical response quantity 7 for a position 20 of the armature 1 of 30°.

For the analysis of the measured values 51 of the physical response quantity 7, it can be beneficial to calculate the correlation between the latest and the determined first harmonic 53. In this way, a type of plausibility test can be performed in respect of the determined physical response quantity 7 and the result that has been determined can be validated. If applicable, the synchronous machine 2 can be subjected to further test current vectors 21, each of which has an identical current magnitude 22 and a different angle 23. See the further figures for the reference signs that are cited here but are not illustrated in FIG. 6.

Figure 7:
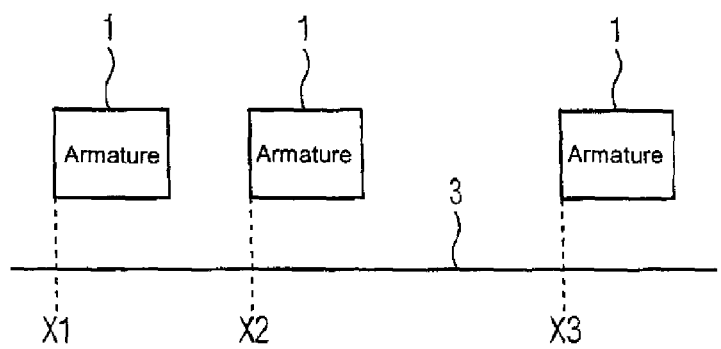
FIG. 7 shows a schematic drawing of a further embodiment of the method according to the present invention.

FIG. 7 shows a schematic drawing of a further embodiment of the method according to the present invention. In this case, a physical response quantity 7 is the acceleration of an armature 1 of a synchronous machine 2 during the application of a test current vector 4 to the synchronous machine 2. The application takes place at the time point t2, at which the armature 1 is situated at the position x2. This position is measured, for example, by a position measuring device such as an incremental transducer or an absolute value transducer 15 (FIG. 5). The position x1 of the armature 1 is measured at a time point t1, which occurs before the time point t2 of the application. The position x3 of the armature 1 is measured again at the time point t3, which still occurs during the application. The speed v2 of the armature 1 before application can be measured initially as v2=(x2−x1)/(t2−t1) assuming uniform movement at constant speed. During the application of a test current vector 4 to the synchronous machine 2, the armature is accelerated at a uniform acceleration a. Position x3 at the time point t3 is calculated as x3=x2+(t3−t2)*v2+(t3−t2)$^2$*a/2. Since it is possible to measure the time points t1, t2 and t3 and/or the time differences, and the position measuring device can measure the positions x1, x2 and x3 of the armature 1, the acceleration a is the sole unknown in the above cited relationships and can be determined by simple transformations and calculations. See the other figures for the reference symbols that are cited here but are not illustrated in FIG. 7.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for determining a position of an armature of a synchronous machine relative to a stator of the synchronous machine, comprising the steps of:
   a) applying to the synchronous machine a plurality of first test current vectors, with each first test current vector having identical current magnitude and a different angle in relation to an armature-related d,q coordinate system,
   b) during application of the first test current vectors to the synchronous machine, determining values of a physical response quantity of the armature proportional to the q component of the first test current vectors, c) determining a first harmonic of the determined values of the physical response quantity as a function of the angle, and d) determining the position of the armature relative to the stator as a zero crossing of the first harmonic where a first derivative of the first harmonic is positive.

2. The method of claim 1, further comprising the steps of:
determining a correlation between the determined values of the physical response quantity and the determined first harmonic of the physical response quantity,
comparing the determined correlation with a predetermined minimal value, and
when the determined correlation is smaller than the predetermined minimal value: repeating the method steps a) through d) using a plurality of second test current vectors having identical current magnitude and a different angle in relation to an armature-related d,q coordinate system, with the current magnitude of the second test current vectors being greater than the current magnitude of the first test current vectors.

3. The method of claim 1, wherein the physical response quantity is a force acting on the armature.

4. The method of claim 1, wherein the physical response quantity is an acceleration of the armature.

5. The method of claim 1, wherein the angle of the test current vectors is selected such that the determined physical response quantities of the armature oppose each other in two consecutive applications of the test current vectors to the synchronous machine.

6. The method of claim 4, further comprising the steps of:
determining the acceleration of the armature by measuring a change in position of the armature caused by one of the test current vectors and a time required for the change, and
calculating the acceleration as a quotient of the change in position and the square of the time required for the change.

7. The method of claim 1, further comprising the steps of:
measuring an absolute position of the armature using an absolute value transducer,
calculating a deviation of the measured absolute position from the position of the armature determined from the zero crossing of the first harmonic, and
outputting an error message when the calculated deviation is greater than a predetermined value.

8. A processing unit for determining a position of an armature of a synchronous machine relative to a stator of the synchronous machine, comprising:
a first processor for specifying to a converter unit reference values of test current vectors, with each test current vector having identical current magnitude and a different angle in relation to an armature-related d,q coordinate system,
a second processor for determining, during application of the test current vectors to the synchronous machine, values of a physical response quantity of the armature proportional to the q component of the test current vectors,
a third processor for determining a first harmonic of the determined values of the physical response quantity as a function of the angle, and
a fourth processor for determining the position of the armature relative to the stator as a zero crossing of the first harmonic where a first derivative of the first harmonic is positive.

9. The processing unit of claim 8, wherein the processing unit further includes:
a fifth processor for determining a correlation between the determined values of the physical response quantity and the determined first harmonic of the physical response quantity, and
a sixth processor for comparing the determined correlation with a predetermined minimal value.

10. An absolute value transducer for measuring an absolute position of an armature of a synchronous machine relative to a stator of the synchronous machine, comprising:
a processing unit comprising
a first processor for specifying to a converter unit reference values of test current vectors, with each test current vector having identical current magnitude and a different angle in relation to an armature-related d,q coordinate system,
a second processor for determining, during application of the test current vectors to the synchronous machine, values of a physical response quantity of the armature proportional to the q component of the test current vectors,
a third processor for determining a first harmonic of the determined values of the physical response quantity as a function of the angle, and
a fourth processor for determining the position of the armature relative to the stator as a zero crossing of the first harmonic where a first derivative of the first harmonic is positive,
a fifth processor for calculating a deviation of the measured absolute position from the position of the armature determined from the zero crossing of the first harmonic, and
an output unit for outputting an error message when the calculated deviation is greater than a predetermined value.

11. A control unit for a synchronous machine, comprising:
a processing unit for determining a position of an armature of the synchronous machine relative to a stator of the synchronous machine, the processing unit comprising:
a first processor for specifying to a converter unit reference values of test current vectors, with each test current vector having identical current magnitude and a different angle in relation to an armature-related d,q coordinate system,
a second processor for determining, during application of the test current vectors to the synchronous machine, values of a physical response quantity of the armature proportional to the q component of the test current vectors,
a third processor for determining a first harmonic of the determined values of the physical response quantity as a function of the angle, and
a fourth processor for determining the position of the armature relative to the stator as a zero crossing of the first harmonic where a first derivative of the first harmonic is positive,
the control unit further comprising a converter unit for applying the test current vectors to the synchronous machine.

* * * * *